(12) United States Patent
Marchaj

(10) Patent No.: US 10,415,471 B2
(45) Date of Patent: Sep. 17, 2019

(54) VARIABLE VOLUME ACOUSTIC DAMPER

(71) Applicant: UNITED TECHNOLOGIES CORPORATION, Farmington, CT (US)

(72) Inventor: Ian T. Marchaj, Old Saybrook, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 374 days.

(21) Appl. No.: 15/365,466

(22) Filed: Nov. 30, 2016

(65) Prior Publication Data

US 2018/0149083 A1 May 31, 2018

(51) Int. Cl.
*F02C 7/045* (2006.01)
*G10K 11/172* (2006.01)
*F02K 3/06* (2006.01)

(52) U.S. Cl.
CPC .............. *F02C 7/045* (2013.01); *F02K 3/06* (2013.01); *G10K 11/172* (2013.01); *F05D 2220/32* (2013.01); *F05D 2220/323* (2013.01); *F05D 2260/96* (2013.01); *F05D 2270/333* (2013.01); *Y02T 50/671* (2013.01)

(58) Field of Classification Search
CPC ....... B64D 33/02; F02C 7/045; G10K 11/172; F05D 2260/96
See application file for complete search history.

(56) References Cited

U.S. PATENT DOCUMENTS

| | | | | |
|---|---|---|---|---|
| 6,811,372 B1* | 11/2004 | Emborg | ................. | F02C 7/045 181/292 |
| 2002/0000343 A1 | 1/2002 | Paschereit | | |
| 2006/0169533 A1* | 8/2006 | Patrick | ................. | B64D 33/02 181/210 |
| 2008/0296431 A1 | 12/2008 | Ivers | | |
| 2010/0133378 A1* | 6/2010 | Lidoine | ................. | F02C 7/045 244/1 N |
| 2010/0301161 A1* | 12/2010 | Chene | ................. | B64D 33/02 244/1 N |
| 2012/0204534 A1 | 8/2012 | Kenyon | | |
| 2016/0298847 A1 | 10/2016 | Nguyen | | |
| 2018/0149083 A1* | 5/2018 | Marchaj | ................. | F02C 7/045 |
| 2018/0258853 A1* | 9/2018 | Marchaj | ................. | F02K 1/827 |
| 2018/0258857 A1* | 9/2018 | Prasad | ................. | F02K 1/827 |

OTHER PUBLICATIONS

European Patent Office, European Search Report dated May 14, 2018 in Application No. 17196315.0-1007.

* cited by examiner

*Primary Examiner* — Hieu T Vo
*Assistant Examiner* — Arnold Castro
(74) *Attorney, Agent, or Firm* — Snell & Wilmer L.L.P.

(57) ABSTRACT

A gas turbine engine may include at least one of a fan inlet case and a bypass duct case. Additionally, the gas turbine engine may include a variable volume acoustic damper coupled to the at least one of the fan inlet case and the bypass duct case, wherein the variable volume acoustic damper is configured to damp acoustic energy. The variable volume acoustic damper may include a case and a diaphragm movably coupled within the case. An acoustic volume may be defined by a position of the diaphragm relative to the case and the acoustic volume may correspond to and may be configured to damp acoustic energy of a gas turbine engine.

17 Claims, 8 Drawing Sheets

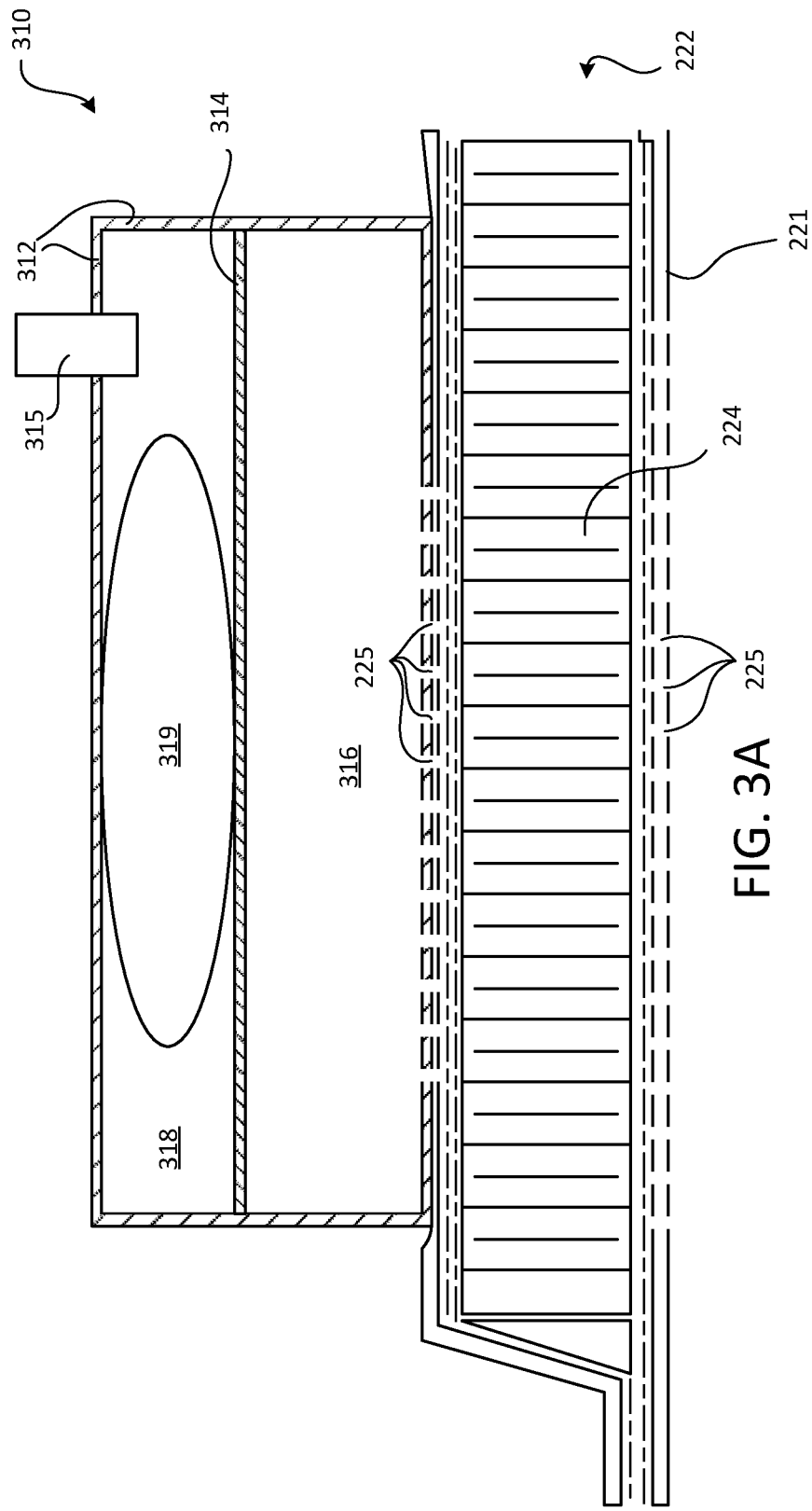

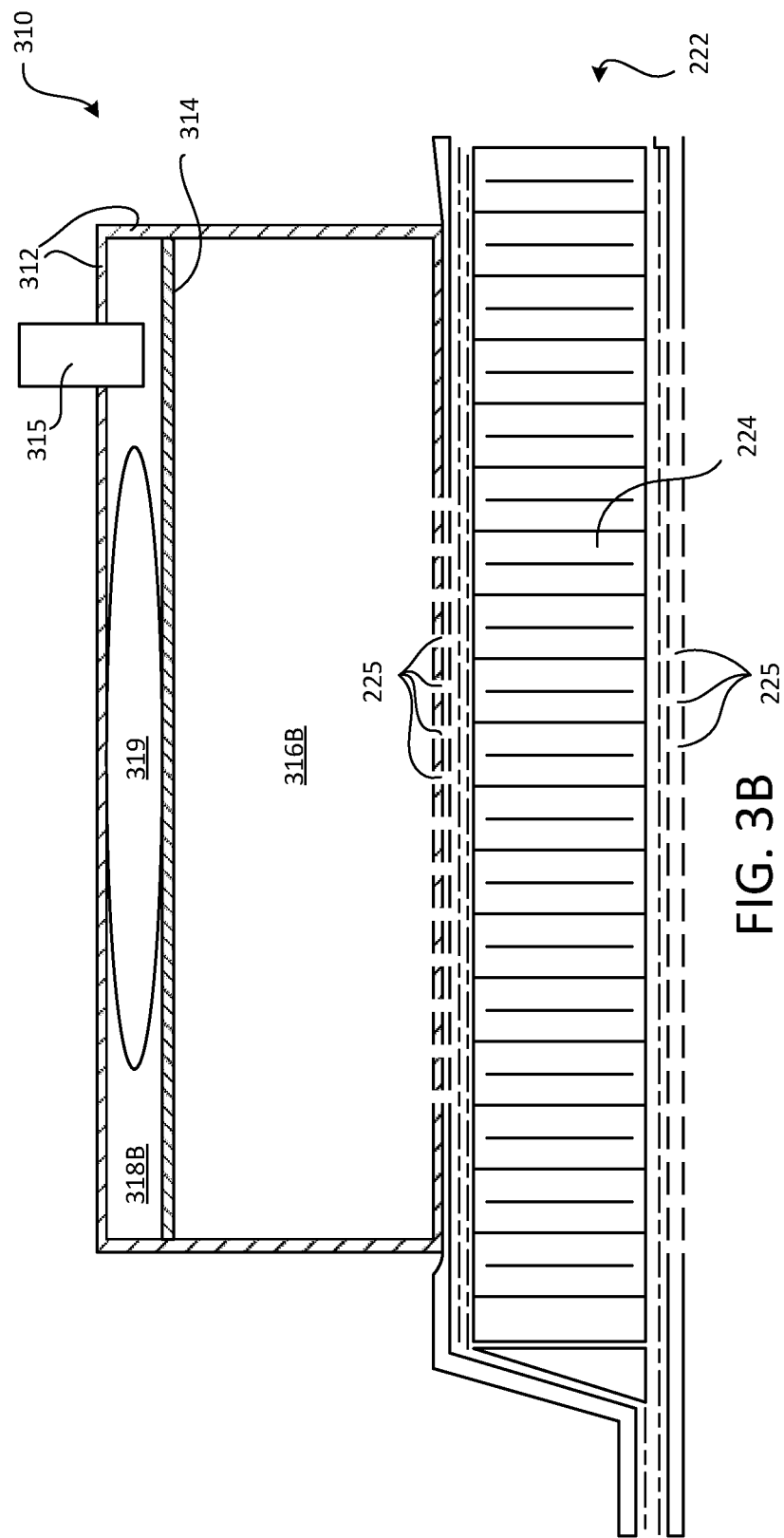

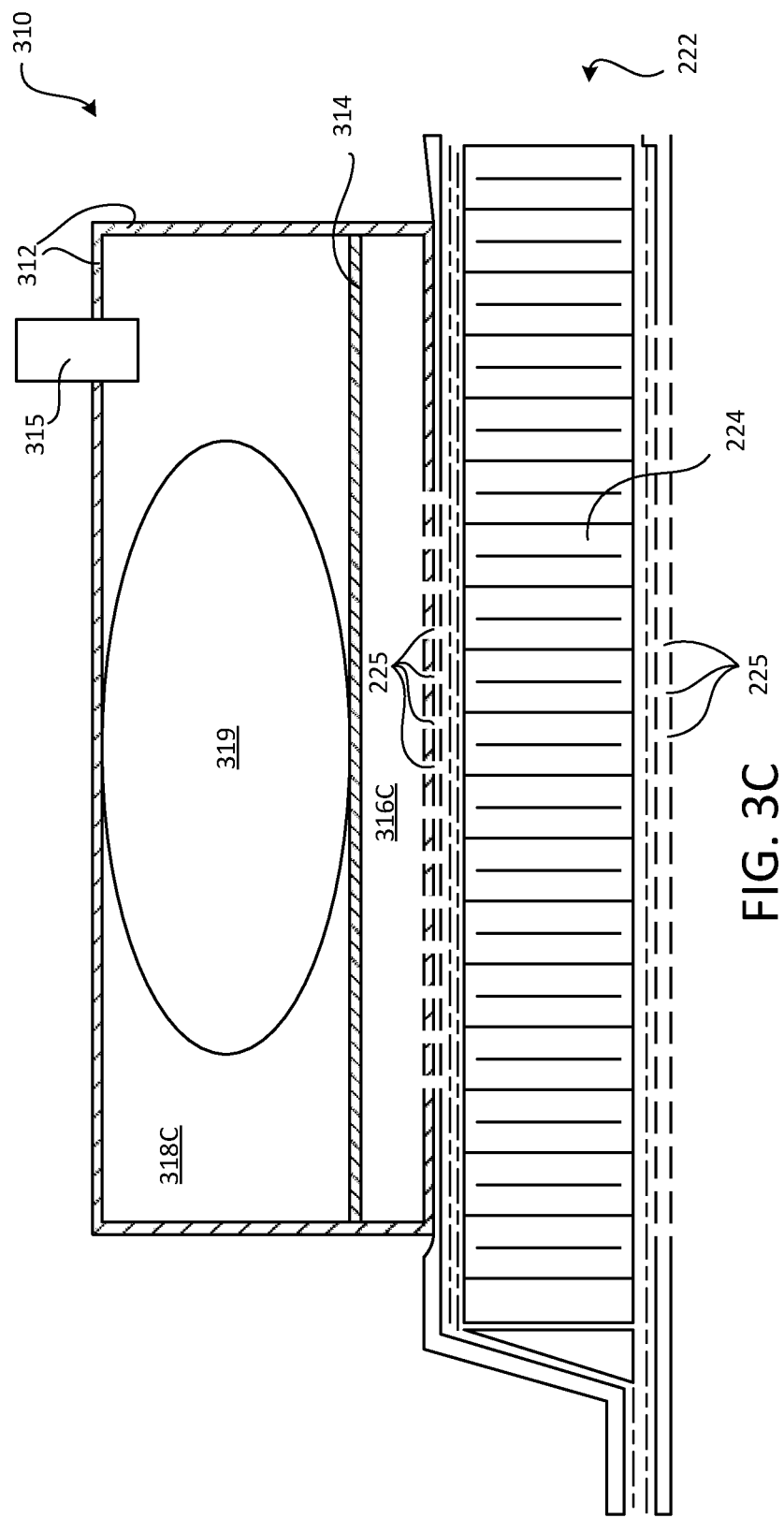

VARIABLE VOLUME ACOUSTIC DAMPER

FIELD

The present disclosure relates to gas turbine engines and, more particularly, to an apparatus and method of damping fan flutter and other acoustic phenomena from a gas turbine engine.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

Under various operating conditions, fan blades of a fan section of a gas turbine engine may be susceptible to fan flutter, which is an aeroelastic condition that can be detrimental to the life of the fan blades, can decrease the efficiency of the gas turbine engine, and may have an adverse noise impact on communities and areas surrounding airports. For example, during high load conditions, such as during take-off and landing, the fan blades may vibrate, bend, and/or oscillate (i.e., "flutter").

SUMMARY

In various embodiments, the present disclosure provides a gas turbine engine. The gas turbine engine may include at least one of a fan inlet case and a bypass duct case. Additionally, the gas turbine engine may include a variable volume acoustic damper coupled to the at least one of the fan inlet case and the bypass duct case, wherein the variable volume acoustic damper is configured to damp acoustic energy.

In various embodiments, the variable volume acoustic damper includes a case and a diaphragm movably coupled within the case. In such embodiments, an acoustic volume is defined by a position of the diaphragm relative to the case and the acoustic volume corresponds to and is configured to damp the acoustic energy. In various embodiments, the fan inlet case includes a radially inward panel to which the variable volume acoustic damper is coupled, wherein the radially inward panel is configured to allow air to pass through the radially inward panel and into the variable volume acoustic damper. In various embodiments, the radially inward panel of the fan inlet case comprises an acoustic treatment. The acoustic treatment may include a honeycomb structure. The radially inward panel may include perforations for fluid communication between air in the fan section and the variable volume acoustic damper.

Also disclosed herein, according to various embodiments, is an acoustic damper that includes a case and a diaphragm movably coupled within the case. The acoustic volume may be defined by a position of the diaphragm relative to the case and the acoustic volume may correspond to and may be configured to damp acoustic energy of a gas turbine engine. In various embodiments, the diaphragm is movably coupled to the case via fluid seals and thus the diaphragm fluidly divides the case into the acoustic volume and a secondary compartment. A diaphragm movement mechanism may be disposed in the secondary compartment. The secondary compartment may include a vent that is open to ambient and the diaphragm movement mechanism may include an expandable bladder filled with gas, wherein a size of the expandable bladder is dependent on ambient pressure. The gas in the expandable bladder may have a lower molecular weight than air.

In various embodiments, the expandable bladder is configured to expand in response to a decrease in ambient pressure, thereby moving the position of the diaphragm to decrease the acoustic volume. The expandable bladder may also be configured to retract in response to an increase in ambient pressure, thereby moving the position of the diaphragm to increase the acoustic volume. The diaphragm movement mechanism may include an actuator. The acoustic damper may include a controller that is in electrical communication with the actuator and the controller may control the position of the diaphragm via the actuator.

In various embodiments, the controller has a feedback loop architecture such that actuation of the actuator and thus the position of the diaphragm is dependent on a detected operating condition of the gas turbine engine. For example, an acoustic transducer may be configured to detect characteristics of the acoustic energy, wherein actuation of the actuator by the controller is dependent on the characteristics of the acoustic energy.

Also disclosed herein, according to various embodiments, is a method for damping acoustic energy of a gas turbine engine. The method may include adjusting a movable diaphragm of an acoustic damper coupled to at least one of a fan inlet case and a bypass duct case of the gas turbine engine. In various embodiments, the method may further include detecting an operating condition of the gas turbine engine, wherein adjusting the movable diaphragm of the acoustic damper occurs in response to detecting the operating condition of the gas turbine engine. In various embodiments, detecting the operating condition of the gas turbine engine includes detecting a sound level of the gas turbine engine. For example, detecting the sound level of the gas turbine engine may include utilizing an acoustic transducer disposed on a radially inward surface of a fan section of the gas turbine engine. In various embodiments, adjusting the movable diaphragm includes utilizing an expandable bladder filled with gas.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 3A illustrates a cross-sectional view of a passive acoustic damper coupled to a gas turbine engine, in accordance with various embodiments;

FIG. 3B illustrates a cross-sectional view of a passive acoustic damper coupled to a gas turbine engine, in accordance with various embodiments;

FIG. 3C illustrates a cross-sectional view of a passive acoustic damper coupled to a gas turbine engine, in accordance with various embodiments;

Figure 1:
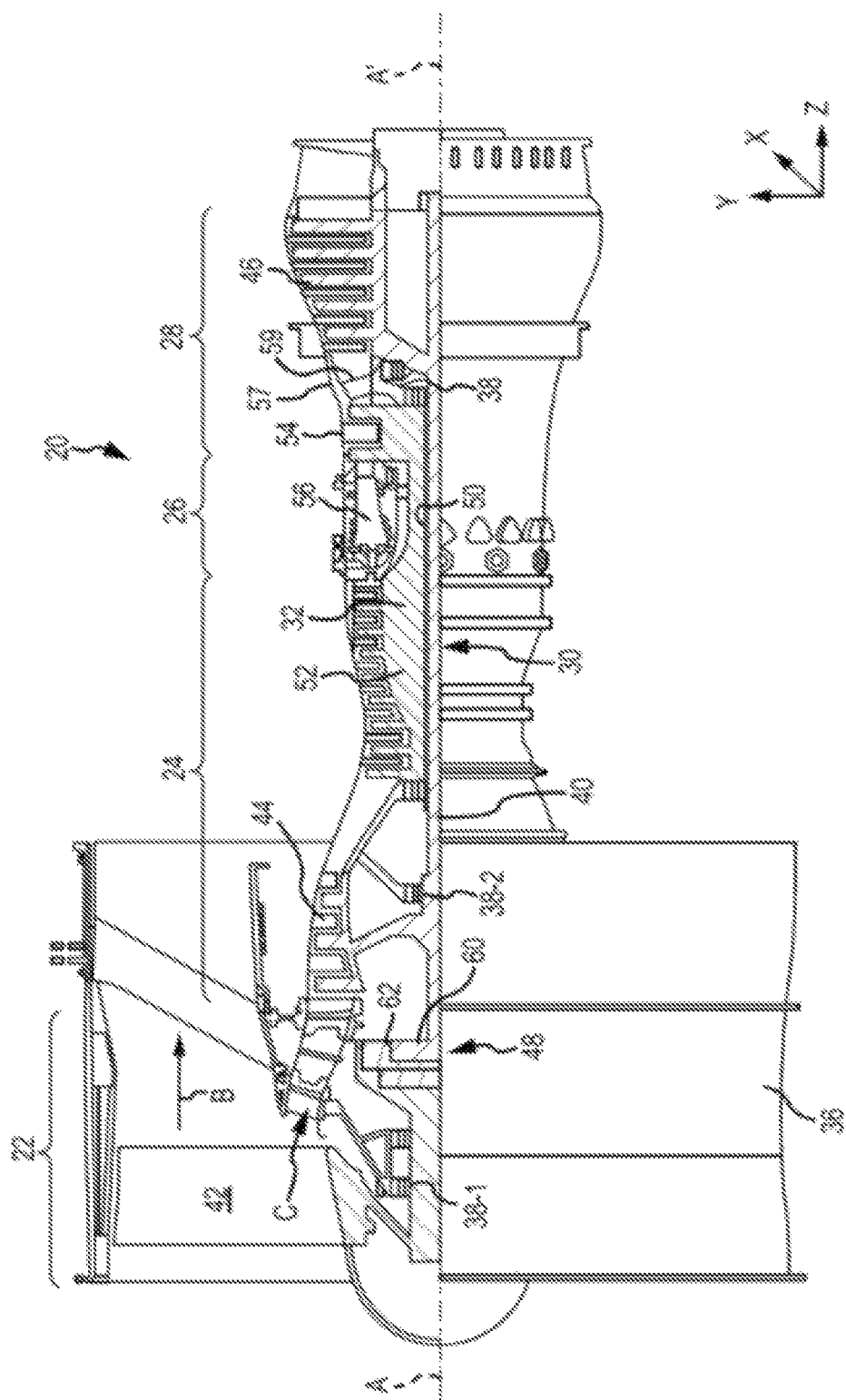
FIG. 1 illustrates a cross-sectional view of an exemplary gas turbine engine, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant (e.g., air) along a bypass flow-path B while compressor section 24 can drive coolant along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

In various embodiments, geared architecture 48 may be an epicyclic gear train, such as a star gear system (i.e., a sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In various embodiments, gas turbine engines with higher bypass ratio engines may have a higher degree of fan noise caused by fan flutter. As described above, fan flutter and other acoustic phenomena may have various deleterious effects on the operation and/or performance of the gas turbine engine 20 and may adversely affect the community noise level surrounding airports. Accordingly, in various embodiments and with reference to FIG. 2, a variable volume acoustic damper 210 is disclosed herein. Throughout the present disclosure, like numerals denote like elements.

Figure 2:
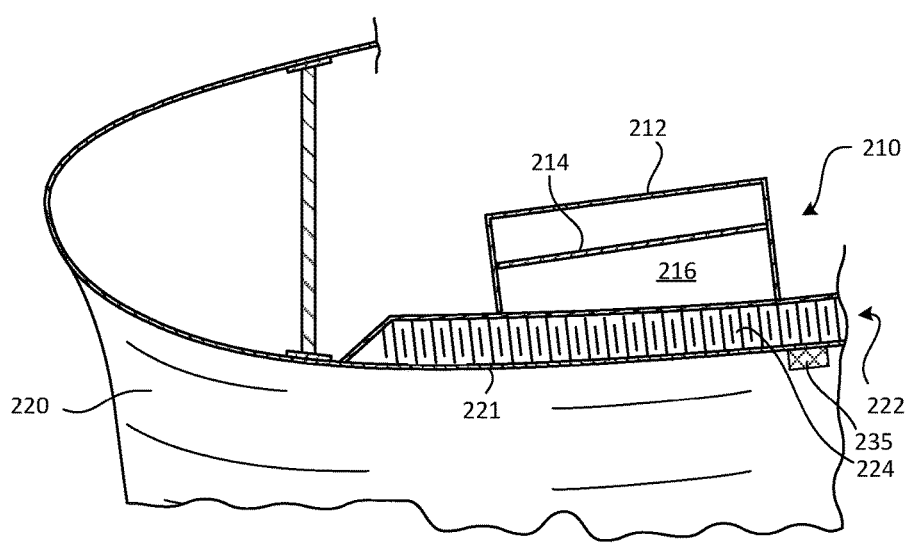
FIG. 2 illustrates a partial, perspective cross-sectional view of a variable volume acoustic damper coupled to a gas turbine engine, in accordance with various embodiments.

With reference to FIGS. 1 and 2, the variable volume acoustic damper 210, also referred to herein simply as an "acoustic damper," may be coupled to a fan inlet case 220 of the fan section 22 of the gas turbine engine 20. While numerous details are included herein pertaining to the implementation of the variable volume acoustic damper 210 in conjunction with the fan inlet case 220 and to mitigate fan flutter, the scope of the present disclosure is not limited to reducing fan flutter caused by fan blades in just the fan inlet case or the fan section of a gas turbine engine. Instead, the variable volume acoustic damper 210 disclosed herein may be coupled and otherwise implemented in other areas/sections of the gas turbine engine 20 to reduce and/or otherwise mitigate detrimental acoustic phenomena in other areas/sections. For example, the variable volume acoustic damper 210 may be coupled to a bypass duct case (e.g., structure and/or casing formed around the bypass flow-path B mentioned above) and may generally damp acoustic energy.

The acoustic damper 210 is generally configured to damp fan flutter of the fan blades 42 and other acoustic phenomena. That is, the acoustic damper 210 is generally configured to absorb and/or otherwise attenuate acoustic energy in the form of fan noise caused by rotation of the fan blades 42 (e.g., fan flutter) and other, general community acoustic energy from the gas turbine engine 20. Accordingly, the acoustic damper 210 disclosed herein may improve the operating efficiency of the gas turbine engine 20 and/or may improve the lifecycle duration of the fan 42, among other benefits. The acoustic damper 210 may include a case 212 and a diaphragm 214 movably coupled within the case 212. Although described in greater detail below with momentary reference to FIG. 3A, an acoustic volume (e.g., an acoustic damping volume) 216 may be defined by a position of the diaphragm 214 within the case 212. The acoustic volume 216 may correspond to and may be configured to damp the fan flutter and other acoustic phenomena.

In various embodiments, the fan inlet case 220 is an annular structure that extends circumferentially around the fan blades 42. In various embodiments, the fan inlet case 220 includes a radially inward panel 221 through which air can flow in order to enter the acoustic damper 210. In various embodiments, the radially inward panel 221 itself may include an acoustic treatment and/or may include an acoustic liner 222. That is, an acoustic liner 222 may be disposed between the flowpath of air in the fan section 22 of the gas turbine engine 20 and the acoustic volume 216 of the acoustic damper 210. Accordingly, air in the fan section 22 may be configured to flow through the acoustic liner 222 and flow into the acoustic damper 210. In various embodiments, both the acoustic liner 222 and the acoustic damper 210 may contribute to damping the fan flutter and other acoustic phenomena. In various embodiments, the acoustic liner 222 has a honeycomb structure 224 (e.g., a plurality of honeycomb cells) that helps to absorb acoustic energy. In various embodiments, the acoustic damper 210 of the present disclosure may be implemented in place of the acoustic liner 222.

In various embodiments, and with reference to FIG. 3A, the diaphragm 314 of the acoustic damper 310 divides the case 312 into two compartments: the acoustic volume 316 that is in fluid communication with the air in the fan section 22 of the gas turbine engine 20 and a secondary compartment 318. In various embodiments, the acoustic volume 316 may be in fluid communication with the air in the fan section 22 of the gas turbine engine 20 via one or more apertures or perforations 225 in the radially inward panel 221. In embodiments in which the acoustic liner 222 is implemented, both radial sides of the acoustic liner 222 may have apertures/perforations 225 through which air may flow.

With continued reference to FIG. 3A, and according to various embodiments, a diaphragm movement mechanism 319 is disposed and/or at least partially housed within the secondary compartment 318. As described in greater detail below, the position of the diaphragm 314 relative to the case 312 contributes to the size and/or dimensions of the acoustic volume 316. Said differently, the acoustic damper 310 is a 'variable volume' acoustic damper because the dimensions of the acoustic volume 316 change in response to the diaphragm 314 moving within the case 312. The acoustic damper 310 may include sealing elements that fluidly seal the diaphragm 314 to the case 312 and thereby fluidly isolate the acoustic volume 316 from the secondary compartment 318. In other words, the diaphragm 314 may be coupled to the case 312 via fluid seals. Accordingly, the acoustic damper 310 may be tuned to have a desired acoustic volume 316 that corresponds with and is configured to damp specific fan flutter and other acoustic phenomena. For example, a first operating condition of the gas turbine engine 20 may be susceptible to acoustic energy having first acoustic characteristics, such acoustic frequency and/or acoustic amplitude, among others. The acoustic damper 310 may be configured to position the diaphragm 314 in a first position in order to create a first acoustic volume 316 that corresponds with and damps the acoustic energy having the first acoustic characteristics. As described in greater detail below, movement of the diaphragm 314 may be accomplished by the diaphragm movement mechanism 319.

In various embodiments, and with continued reference to FIG. 3A, the acoustic damper 310 may be a passive variable volume acoustic damper and thus may be configured to passively react to operating conditions in order to damp fan flutter and other acoustic phenomena. In various embodiments, the acoustic damper 310 may include a vent 315 that is open to ambient atmospheric conditions, thereby allowing the secondary compartment 318 of the acoustic damper 310 to fill with air at ambient pressure. In such embodiments, the diaphragm movement mechanism 319 may be an expandable bladder 319 (e.g., a balloon) that is disposed in the secondary compartment 318. The expandable bladder 319 may be filled with a fluid, such as a gas that has a lower molecular weight than air (e.g., helium), and may be sealed so as to isolate the fluid/gas from the air in the secondary compartment 318. In various embodiments, the expandable bladder 319 may be coupled to the diaphragm 314 and to a wall of the case 312 opposite the diaphragm 314. Accordingly, the size of the expandable bladder 319, with its isolated gas contained therein, may be dependent on the ambient pressure of the air in the secondary compartment 318. That is, expandable bladder 319 may passively react to the ambient pressure to change the position of the diaphragm 314 and thereby change the acoustic volume 316.

In various embodiments, and with reference to FIGS. 3B and 3C, the ambient air pressure of the secondary compartment 318B/318C may affect the size of the expandable bladder 319 and thus may affect the position of the diaphragm 314 and may thereby change the acoustic volume 316B/316C. That is, the expandable bladder 319 may be configured to retract in size, with reference to FIG. 3B, in response to an increase in ambient atmospheric pressure in the secondary compartment 318B, thereby moving the position of the diaphragm 314 to increase the acoustic volume 316B. The expandable bladder 319 may also be configured to expand in size, with reference to FIG. 3C, in response to a decrease in ambient atmospheric pressure in the secondary compartment 318C, thereby moving the position of the diaphragm 314 to decrease the acoustic volume 316C. This passive adjustment of the acoustic volume 316B/316C may correspond with, for example, the operating conditions and operating ambient environment of an aircraft. For example, during landing and/or take-off at lower elevations, the ambient pressure in the secondary compartment 318B may be higher and thus the acoustic volume 316B may be increased to compensate for the fan flutter and other acoustic phenomena generated during landing and/or take-off engine operating conditions. Similarly, during flight at higher/cruise elevations, the ambient pressure in the secondary compartment 318C may be lower and thus the acoustic volume 316C may be decreased to compensate for the fan flutter and/or other acoustic phenomena expected at cruising engine operating conditions.

Figure 4:
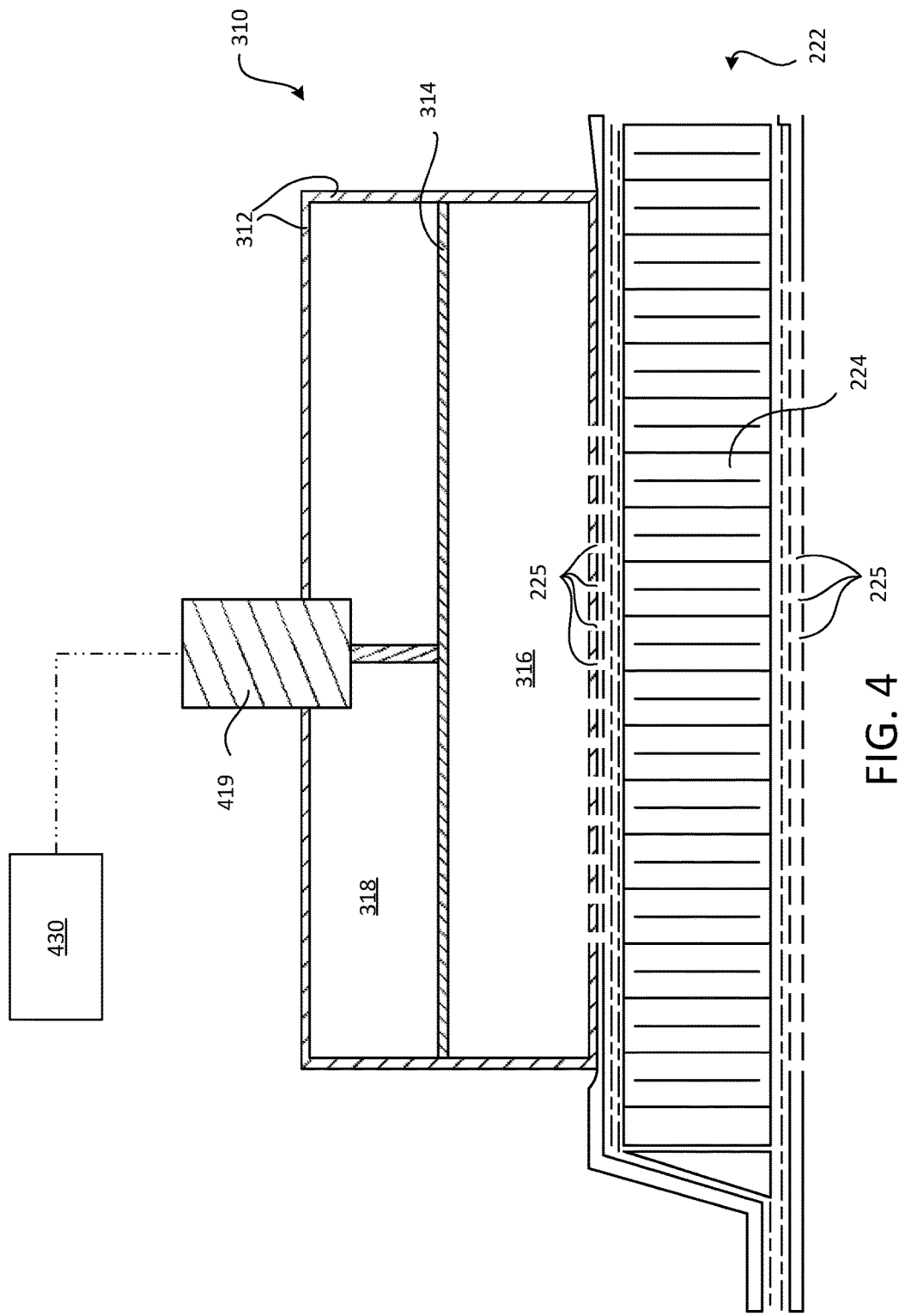
FIG. 4 illustrates a cross-sectional view of an active acoustic damper coupled to a gas turbine engine, in accordance with various embodiments.

In various embodiments, and with reference to FIG. 4, the diaphragm movement mechanism may be an actuator 419. That is, the diaphragm movement mechanism may be actively controlled via and may be in electrical communication with a controller 430. The actuator 419, for example, may be an electromechanical actuator that, in response to control signals from the controller 430, causes a shaft coupled to the diaphragm 314 to translate (e.g., extend and retract), thereby changing/controlling the acoustic volume 316. In various embodiments, the controller 430 includes a feedback loop control architecture such that actuation of the actuator 419, and thus the position of the diaphragm 314 and the size of the acoustic volume 316, is dependent on a detected operating condition of the gas turbine engine 20. For example, the controller 430 may be configured to receive input from one or more sensors/detectors regarding an operating variable of the gas turbine engine 20 and/or the aircraft. Based on the received input, the controller 430 may actuate the actuator 419 to change the acoustic volume 316 to damp acoustic noise energy, such as fan flutter. In various embodiments, the input received by the controller 430 may be related to the acoustic energy of the gas turbine engine 20. For example, one or more transducers 235 (with reference to FIG. 2) may be employed to measure characteristics of the acoustic energy, and said measured characteristics may be utilized by the controller 430 to adjust the position of the diaphragm 314 via the actuator 419, thereby producing a desired/optimized acoustic volume 316 to damp the acoustic energy.

Figure 5:
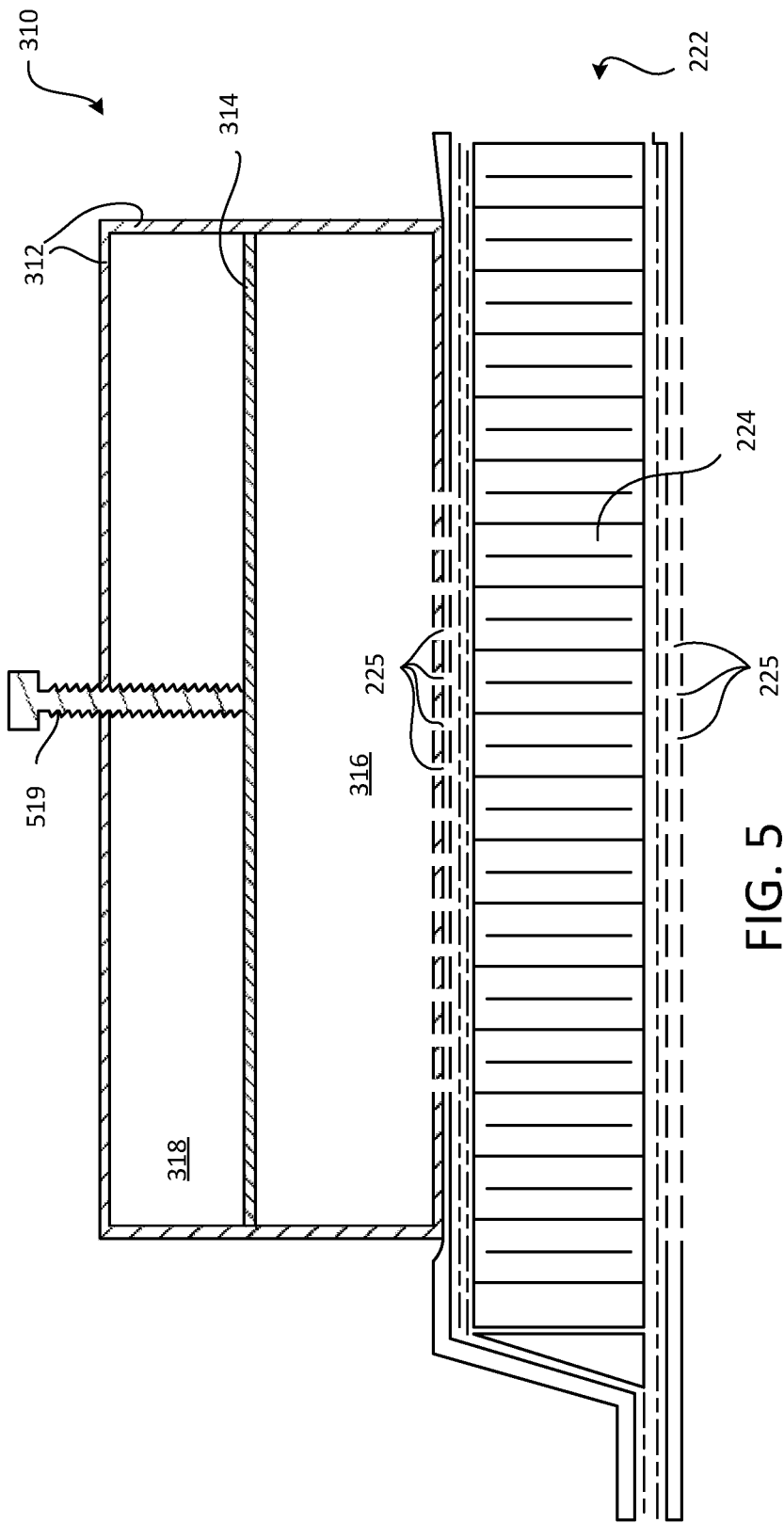
FIG. 5 illustrates a cross-sectional view of a discrete acoustic damper coupled to a gas turbine engine, in accordance with various embodiments.

In various embodiments, and with reference to FIG. 5, the diaphragm movement mechanism may be a threaded shaft 519 or other similar component that is coupled to the diaphragm 314. In various embodiments, the threaded shaft 519 may be rotated to change the position of the diaphragm 314, thereby changing the acoustic volume 316. In various embodiments, the threaded shaft 519 may be periodically manually rotated to produce an acoustic volume 316 that corresponds to an expected operating condition and thus is configured to damp expected fan flutter and other acoustic energy.

Figure 6:
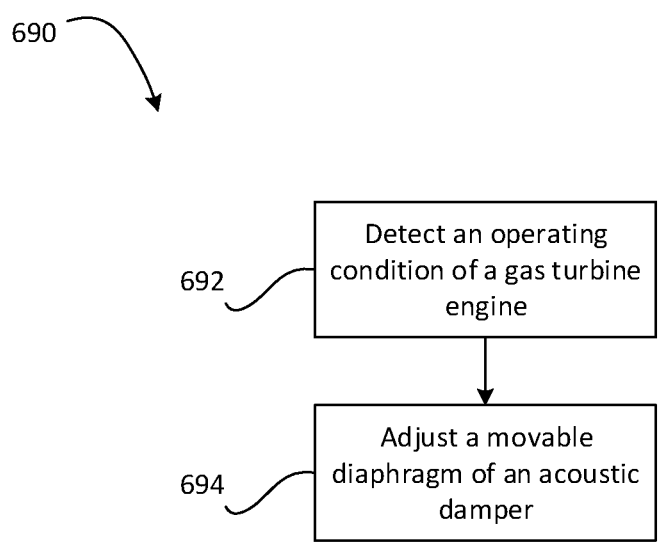
FIG. 6 is a schematic flow chart diagram of a method for damping fan flutter acoustics of a gas turbine engine, in accordance with various embodiments.

In various embodiments, and with reference to FIG. 6, a method 690 for damping fan flutter and other acoustic phenomena of the gas turbine engine 20 is disclosed herein. The method 690 includes adjusting a movable diaphragm of an acoustic damper coupled to a fan inlet case (or bypass duct case) of the gas turbine engine 20 at step 694. The method 690 may further include detecting an operating condition of the gas turbine engine at step 692. In various embodiments, adjusting the movable diaphragm of the acoustic damper (step 694) occurs in response to detecting the operating condition of the gas turbine engine (step 692). In various embodiments, detecting the operating condition of the gas turbine engine includes detecting a sound level of the gas turbine engine. For example, detecting the sound level of the gas turbine engine may include utilizing an acoustic transducer 235 (with reference to FIG. 2) disposed on a radially inward surface of a fan section or a bypass duct case of the gas turbine engine. In various embodiments, adjusting the movable diaphragm includes utilizing an expandable bladder filled with gas.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine comprising:
   at least one of a fan inlet case and a bypass duct case, wherein the at least one of the fan inlet case and the bypass duct case comprises a radially inward panel comprising an acoustic treatment, wherein the acoustic treatment comprises a radially inward side and a radially outward side; and
   a variable volume acoustic damper coupled to the radially outward side of the acoustic treatment of the radially inward panel of the at least one of the fan inlet case and the bypass duct case, wherein the variable volume acoustic damper is configured to damp acoustic energy;
   wherein the acoustic treatment of the radially inward panel is configured to allow air to pass through both the radially inward side and the radially outward side of the acoustic treatment and into the variable volume acoustic damper.

2. The gas turbine engine of claim 1, wherein the variable volume acoustic damper comprises:
   a case; and
   a diaphragm movably coupled within the case;
   wherein:
      an acoustic volume is defined by a position of the diaphragm relative to the case; and
      the acoustic volume corresponds to and is configured to damp the acoustic energy.

3. The gas turbine engine of claim 1, wherein the acoustic treatment comprises a honeycomb structure.

4. The gas turbine engine of claim 1, wherein the radially inward panel of the fan inlet case comprises perforations for fluid communication between air in the fan section and the variable volume acoustic damper such that air flows through the perforations, through the acoustic treatment, and into the variable volume acoustic damper.

5. An acoustic damper comprising:
   a case; and
   a diaphragm movably coupled within the case via fluid seals;
   wherein:
      an acoustic volume is defined by a position of the diaphragm relative to the case;
      the acoustic volume corresponds to and is configured to damp acoustic energy of a gas turbine engine;
      the diaphragm fluidly divides the case into the acoustic volume and a secondary compartment;
      a diaphragm movement mechanism is disposed in the secondary compartment.

6. The acoustic damper of claim 5, wherein the secondary compartment comprises a vent that is open to ambient and the diaphragm movement mechanism comprises an expandable bladder filled with gas, wherein a size of the expandable bladder is dependent on ambient pressure.

7. The acoustic damper of claim 6, wherein the gas in the expandable bladder has a lower molecular weight than air.

8. The acoustic damper of claim 6, wherein:
   the expandable bladder is configured to expand in response to a decrease in ambient pressure, thereby moving the position of the diaphragm to decrease the acoustic volume; and
   the expandable bladder is configured to retract in response to an increase in ambient pressure, thereby moving the position of the diaphragm to increase the acoustic volume.

9. The acoustic damper of claim 5, wherein the diaphragm movement mechanism comprises an actuator.

10. The acoustic damper of claim 9, further comprising a controller that is in electrical communication with the actuator, wherein the controller controls the position of the diaphragm via the actuator.

11. The acoustic damper of claim 10, wherein the controller comprises a feedback loop architecture such that actuation of the actuator and thus the position of the diaphragm is dependent on a detected operating condition of the gas turbine engine.

12. The acoustic damper of claim 11, further comprising an acoustic transducer configured to detect characteristics of the acoustic energy, wherein actuation of the actuator by the controller is dependent on the characteristics of the acoustic energy.

13. A method for damping acoustic energy of a gas turbine engine, the method comprising:
   adjusting a movable diaphragm of an acoustic damper coupled to at least one of a fan inlet case and a bypass duct case of the gas turbine engine, wherein an acoustic volume of the acoustic damper is configured to have air supplied to the acoustic volume via air flow through an acoustic treatment.

14. The method of claim 13, further comprising detecting an operating condition of the gas turbine engine, wherein adjusting the movable diaphragm of the acoustic damper occurs in response to detecting the operating condition of the gas turbine engine.

15. The method of claim 14, wherein detecting the operating condition of the gas turbine engine comprises detecting a sound level of the gas turbine engine.

16. The method of claim 15, wherein detecting the sound level of the gas turbine engine comprises utilizing an acoustic transducer disposed on a radially inward surface of a fan section of the gas turbine engine.

17. The method of claim 13, wherein adjusting the movable diaphragm comprises utilizing an expandable bladder filled with gas.

\* \* \* \* \*